US010956961B2

(12) United States Patent
Calio

(10) Patent No.: US 10,956,961 B2
(45) Date of Patent: Mar. 23, 2021

(54) MOBILE APPLICATION FOR MANAGING OFFER RECORDS

(71) Applicant: INTERNATIONAL BUSINESS MACHINES CORPORATION, Armonk, NY (US)

(72) Inventor: Charles W. Calio, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 15/058,356

(22) Filed: Mar. 2, 2016

(65) Prior Publication Data

US 2017/0255988 A1  Sep. 7, 2017

(51) Int. Cl.
| | |
|---|---|
| G06Q 30/06 | (2012.01) |
| G06Q 30/02 | (2012.01) |
| G06F 16/2457 | (2019.01) |
| H04L 29/08 | (2006.01) |
| H04W 4/02 | (2018.01) |

(52) U.S. Cl.
CPC ... *G06Q 30/0633* (2013.01); *G06F 16/24578* (2019.01); *G06Q 30/0256* (2013.01); *G06Q 30/0257* (2013.01); *G06Q 30/0261* (2013.01); *G06Q 30/0269* (2013.01); *G06Q 30/0625* (2013.01); *H04L 67/306* (2013.01); *H04W 4/023* (2013.01)

(58) Field of Classification Search
CPC ............. G06Q 30/0623; G06Q 20/322; G06Q 30/0207; G06Q 20/3224; G06Q 30/0633; H04W 4/02; H04W 8/005; H04L 67/16; H04L 67/306; G06F 17/3053
USPC ........................................................ 705/14.1
See application file for complete search history.

(56) References Cited

U.S. PATENT DOCUMENTS

| | | | |
|---|---|---|---|
| 5,030,957 A | 7/1991 | Evans | |
| 6,658,093 B1 | 12/2003 | Langseth et al. | |
| 7,062,510 B1 | 6/2006 | Eldering | |
| 7,200,566 B1 * | 4/2007 | Moore | G06Q 30/06 705/26.3 |
| 7,376,613 B1 | 5/2008 | Cofino et al. | |

(Continued)

FOREIGN PATENT DOCUMENTS

WO    2008003000 A2    1/2008

OTHER PUBLICATIONS

A Business Model for Personalized Promotion Systems on Using WLAN Localization and NFC Techniques by Kam Yiu Lam, Joseph K. Ng and Jian Tao Wang dated 2013 IEEE.*

(Continued)

*Primary Examiner* — Victoria E Frunzi
(74) *Attorney, Agent, or Firm* — Robert D. Bean

(57) ABSTRACT

The present invention relates to a method and system for managing mobile offer records. The system may receive a query from a user including a shopping list comprising a plurality of items and a maximum price for a set of item descriptions of the shopping list. The system may identify a location of a mobile device. The system may obtain a plurality of offer records based on the location of the mobile device, the shopping list, and the maximum price. The system may normalize the plurality of offer records based on a value of the offer records. The system may rank the plurality of offer records based on the normalization.

10 Claims, 11 Drawing Sheets

(56) References Cited

U.S. PATENT DOCUMENTS

| | | | |
|---|---|---|---|
| 8,065,235 | B2 | 11/2011 | Narayanaswami et al. |
| 8,706,564 | B2* | 4/2014 | Mesaros ............... G06Q 30/02 |
| | | | 705/26.2 |
| 9,824,387 | B2* | 11/2017 | Haver ............... G06Q 30/0639 |
| 2011/0047030 | A1 | 2/2011 | Yoon |
| 2011/0238474 | A1* | 9/2011 | Carr ................... G06O 30/0639 |
| | | | 705/14.23 |
| 2012/0303430 | A1 | 11/2012 | Tiku et al. |
| 2012/0330778 | A1 | 12/2012 | Eastham |
| 2013/0066740 | A1 | 3/2013 | Ouimet et al. |
| 2013/0297424 | A1 | 11/2013 | Baca |
| 2014/0019244 | A1* | 1/2014 | Gundapaneni ..... G06Q 30/0611 |
| | | | 705/14.54 |
| 2014/0025470 | A1* | 1/2014 | Berman ............. G06Q 30/0235 |
| | | | 705/14.26 |
| 2014/0365304 | A1 | 12/2014 | Showers et al. |
| 2015/0012358 | A1 | 1/2015 | Almendras Riesco |
| 2015/0127439 | A1 | 5/2015 | Campos De Figueiredo Faceira et al. |
| 2015/0348169 | A1 | 12/2015 | Harris et al. |
| 2015/0379601 | A1* | 12/2015 | Ouimet ............. G06Q 30/0613 |
| | | | 705/26.41 |
| 2016/0284006 | A1* | 9/2016 | Osborne ............ G06Q 30/0631 |

OTHER PUBLICATIONS

IBM: List of IBM Patent Applications Treated as Related (Appendix P), Jun. 6, 2016, pp. 1-2.

Calio, Pending U.S. Appl. No. 15/058,352, filed Mar. 2, 2016, titled "Management of Offer Records for a Mobile Device," pp. 1-58.

Calio, Pending U.S. Appl. No. 15/171,594, filed Jun. 2, 2016, titled "Mobile Application for Managing Offer Records," pp. 1-56.

Calio, Pending U.S. Appl. No. 15/173,843, filed Jun. 6, 2016, titled "Management of Offer Records for a Mobile Device," pp. 1-53.

Wang, "RFID enabled Pricing Approach in Perishable Food Supply Chains," 2010 IEEE International Conference on Software Engineering and Service Sciences (ICSESS), Jul. 16-18, 2010, pp. 1-5.

Lee et al., "The Impacts of an Electronic Marketplace with Multiple Independent Retailers for Smart Grocery Ordering Systems," Wireless Pers Commun, Published online: Apr. 9, 2011, vol. 60, Copyright Springer Science+Business Media, LLC, 2011, pp. 475-487.

Disclosed Anonymously, "Retail Dynamic Purchase Rules for Collaborative Shopping," An IP.com Prior Art Database Technical Disclosure, IP.com No. 000237262, Publication Date: Jun. 10, 2014, pp. 1-3.

Disclosed Anonymously, "An engaging shopping experience for retail grocers," An IP.com Prior Art Database Technical Disclosure, IP.com No. 000228931D, Publication Date: Jul. 15, 2013, pp. 1-1.

Lawler, "Mobile App Go Dish Brings Dynamic Pricing to the Restaurant World," Posted on Apr. 8 2014, http://techcrunch.com/2014/04/08/go-dish/, Printed on Jan. 12, 2016, pp. 1-4.

Location Aware Information Systems Laboratory at the University of South Florida,"Dynamic Travel Information—Personalized and Delivered to Your Cell Phone," https://www.locationaware.usf.edu/ongoing-research/projects/dynamic-travel-information-personalized-and-delivered-to-your-cell-phone/, Printed on Jan. 12, 2016, pp. 1-2.

BlueList, "Mobile Offers Made Easy," http://www.getbluelist.com/about, Printed on Jan. 26, 2016, Copyright 2016 BlueList, pp. 1-5.

Mell et al., "The NIST Definition of Cloud Computing," National Institute of Standards and Technology, U.S. Department of Commerce, Special Publication 800-145, Sep. 2011, pp. 1-7.

IBM: List of IBM Patents or Patent Applications Treated as Related (Appendix P), Mar. 2, 2016, pp. 1-2.

Pending U.S. Appl. No. 15/058,352, filed Mar. 2, 2016 "Management of Offer Records for a Mobile Device," pp. 1-58.

* cited by examiner

350

---

Generate a shopping list module, wherein the shopping list module is configured for display by the mobile device.
354

↓

Receive a user input via the shopping list module comprising at least one item, wherein a shopping list is generated comprising the at least one item.
358

↓

Generate a price negotiator module, wherein the price negotiator module is configured for display by the mobile device.
362

↓

Receive a user input via the price negotiator module indicating a maximum price for a set of items of the shopping list.
366

↓

Obtain a plurality of offers associated with a plurality of businesses based on a location of the mobile device, the shopping list, and the maximum price.
370

↓

Normalize one or more offer records in the plurality of offer records.
374

↓

Rank the normalized one or more offer records based on the value for the offer record corresponding to the item description.
378

↓

Generating a discount module comprising the offer the offer ranking, wherein the discount module is configured for display on the mobile device.
382

FIG. 3B

MOBILE APPLICATION FOR MANAGING OFFER RECORDS

BACKGROUND

The present invention relates generally to the field of computing, and more particularly to a method and system for data management of offer records.

A traditional business (e.g., a grocery store) may provide static coupons that a customer may collect before shopping at the traditional business. The static coupons may lack personalization and fail to specifically target a particular customer or class of customers. Some traditional businesses may provide a coupon at checkout after a customer has already selected items for purchase (e.g., by including coupons on a back of a receipt). However, providing coupons at checkout (rather than earlier) may miss an opportunity to make a more immediate sale to a customer. Some traditional stores have mobile applications, but many of these applications are store specific and tied to loyalty cards, which will may limit personalized offer records to customers who have signed up for a store specific loyalty card.

SUMMARY

Embodiments of the present invention disclose a method for data management between a mobile device and another device. The method may include generating, by the mobile device, a shopping list module. The shopping list module may be configured for display by the mobile device and configured to receive data associated with a shopping list from the user. The method may include receiving, by the mobile device, data associated with the shopping list from the user. The data associated with the shopping list may include a plurality of item descriptions. The method may include generating, by the mobile device, a price negotiator module. The price negotiator module may be configured for display by the mobile device and configured to receive data associated with a maximum price for a set of item descriptions of the shopping list from the user. The method may include receiving, by the mobile device, data associated with the maximum price for the set of item descriptions of the shopping list from the user. The method may include identifying, by the mobile device, a location of the mobile device. The method may include obtaining, by the mobile device, a plurality of offer records based on the location of the mobile device, the shopping list, and the maximum price. The plurality of offer records may include data defining at least one of a price for the set of item descriptions or a reduction in price for the set of item descriptions. The method may include normalizing, by the mobile device, an offer record in the plurality of offer records, the normalizing may include standardizing a value for the offer record and an item description. The method may include ranking, by the mobile device, the normalized one or more offer records based on the value for the offer record corresponding to the item description. The method may include generating, by the mobile device, a discount module including the plurality of offer records and the ranking. The discount module may be configured for display on the mobile device.

Embodiments of the present invention disclose a computer program product for data management between a mobile device and another device. The computer program product may include a computer readable storage medium having program instructions embodied therewith. The computer readable storage medium is not a transitory signal per se. The program instructions may be executable by a computer to cause the computer to perform a method. The method may include generating, by the mobile device, a shopping list module. The shopping list module may be configured for display by the mobile device and configured to receive data associated with a shopping list from the user. The method may include receiving, by the mobile device, data associated with the shopping list from the user. The data associated with the shopping list may include a plurality of item descriptions. The method may include generating, by the mobile device, a price negotiator module. The price negotiator module may be configured for display by the mobile device and configured to receive data associated with a maximum price for a set of item descriptions of the shopping list from the user. The method may include receiving, by the mobile device, data associated with the maximum price for the set of item descriptions of the shopping list from the user. The method may include identifying, by the mobile device, a location of the mobile device. The method may include obtaining, by the mobile device, a plurality of offer records based on the location of the mobile device, the shopping list, and the maximum price. The plurality of offer records may include data defining at least one of a price for the set of item descriptions or a reduction in price for the set of item descriptions. The method may include normalizing, by the mobile device, an offer record in the plurality of offer records, the normalizing may include standardizing a value for the offer record and an item description. The method may include ranking, by the mobile device, the normalized one or more offer records based on the value for the offer record corresponding to the item description. The method may include generating, by the mobile device, a discount module including the plurality of offer records and the ranking. The discount module may be configured for display on the mobile device.

Embodiments of the present invention disclose a system for data management between a mobile device and another device. The computer system may include a mobile device comprising one or more computer processors, one or more computer-readable storage media, and program instructions stored on the computer-readable storage media for execution by at least one of the one or more processors. The program instruction may include instructions to generate, by the mobile device, a shopping list module. The shopping list module may be configured for display by the mobile device and to receive data associated with a shopping list from the user. The program instruction may include instructions to receive, by the mobile device, data associated with the shopping list from the user. The data associated with the shopping list may include a plurality of item descriptions. The program instruction may include instructions to generate, by the mobile device, a price negotiator module. The price negotiator module may be configured for display by the mobile device and to receive data associated with a maximum price for a set of item descriptions of the shopping list from the user. The program instruction may include instructions to receive, by the mobile device, data associated with the maximum price for the set of item descriptions of the shopping list from the user. The program instruction may include instructions to identify, by the mobile device, a location of the mobile device. The program instruction may include instructions to obtain, by the mobile device, a plurality of offer records based on the location of the mobile device, the shopping list, and the maximum price. The plurality of offer records may include data defining at least one of a price for the set of item descriptions or a reduction in price for the set of item descriptions. The program instruction may include instructions to normalize, by the mobile device, an offer record in the plurality of offer records. The normalizing may include standardizing a value for the offer record and an item description. The program instruction may include instructions to rank, by the mobile device, the normalized offer record based on the value for the offer record corresponding to the item description. The program instruction may include instructions to generate, by the mobile device, a discount module including the plurality of offer records and the ranking. The discount module may be configured for display on the mobile device.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

FIG. 3A-3B are flowcharts illustrating operational steps of a mobile offer application, in accordance with an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
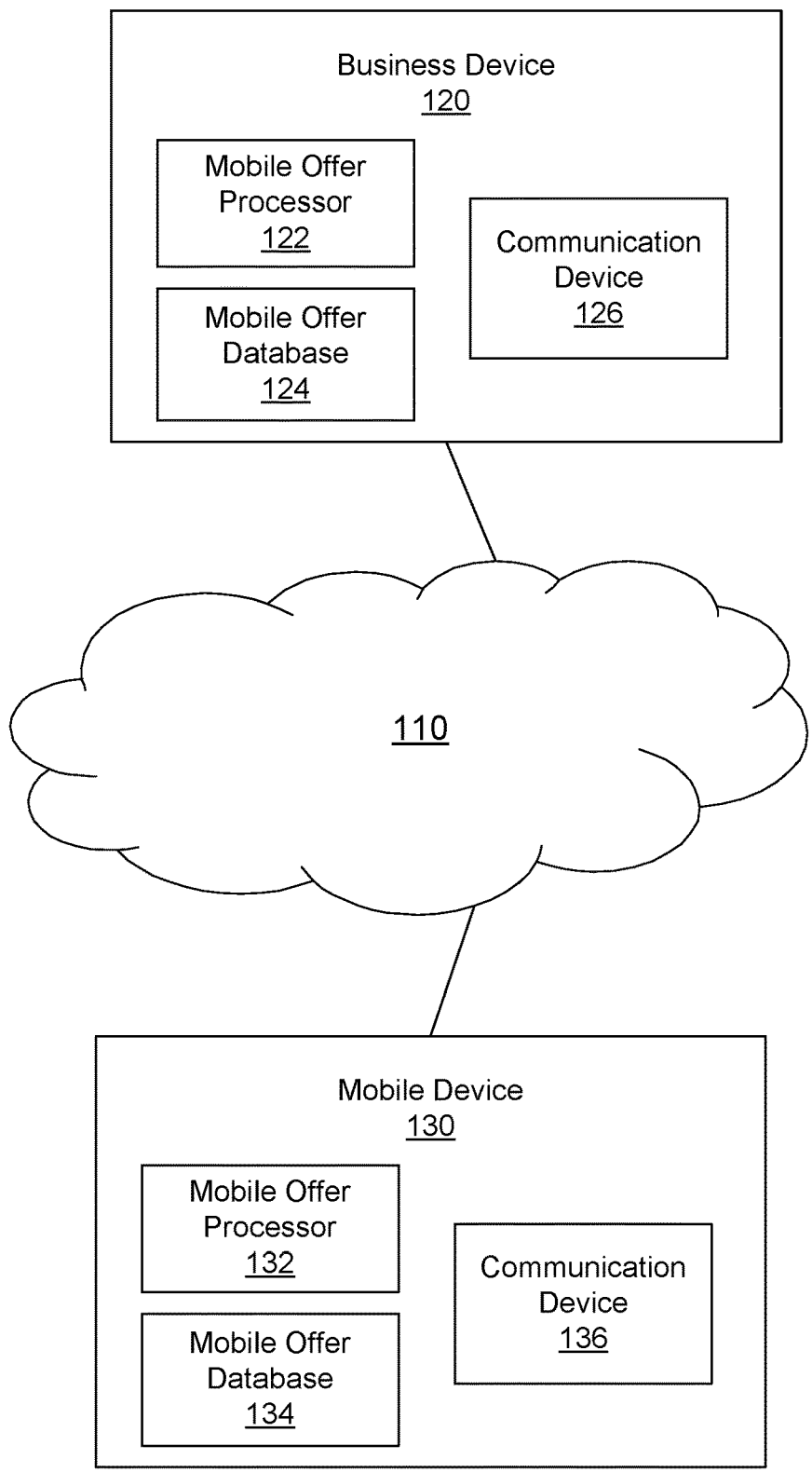
FIG. 1 is a functional block diagram illustrating a mobile offer system, in accordance with an embodiment of the present invention.

Embodiments of the present invention may provide a method and system for detecting and identifying a mobile device (e.g., a smart phone) associated with a customer as the mobile device comes within a proximity of a traditional business (e.g., a grocery store). This can enable instantaneous location based and personalized transmission of data including offer records, discount records, and coupon records to a specific mobile device in a specific location (e.g., a mobile device in or near a store) based on data associated with a user of a mobile device. Traditional 'offline' businesses may be frequented by mobile users with mobile devices, but the traditional business may not have access to information regarding an identity of the mobile user or the mobile user's historical buying patterns. In addition, a traditional business may not have the ability to transmit data to a mobile device associated with a user within a proximity of the traditional business.

Embodiments of the present invention may involve detecting and/or identifying a mobile user in a proximity of a traditional business (e.g., a grocery store). Embodiments may include a mobile application operating on a mobile device (e.g., a smart phone) and a business application operating on a business device (e.g., a server). Embodiments may include generating and managing a mobile application on a mobile device that performs one or more functions, such as, for example, broadcasting data associated with a user profile, receiving offer records associated with one or more elements of the user profile, communicating with a business server to negotiate terms (e.g., price, quantity, quality, delivery time, etc.), or any combination thereof. An offer record may be data stored in a database of an electronic device which may be transmitted by electronic communication. Embodiments of the present invention may include one or more security protocols, such as, for example, isolating the mobile application from a database on the mobile device (e.g., prevent the mobile application from accessing personal user information stored on the mobile device), isolating the mobile application from a database on a business device (e.g., prevent the mobile application from accessing certain business information), or a combination thereof. Embodiments may include generating a user interface to receive input associated with one or more preferences of a user (e.g., enabling a user to input a grocery list, cost preferences for an item or group of items, etc.). Embodiments may include generating a user interface to receive input associated with location preferences of a user (e.g., location services enabled for a store or group of stores by enabling Global Position Service (GPS) location, enabling WIFI location services, etc.). Embodiments may include determining an offer record for a business based on one or more dynamic factors, such as, for example, inventory, market trends, demand, supply, weather, date, time, and other business inputs (e.g., request to attract more customers), or any combination thereof. Embodiments may include transmitting the determined offer record to one or more users. Embodiments may include facilitating a mobile transaction. Embodiments may include deleting the offer record or saving the offer record on the mobile device. Embodiments of the present invention will now be described in detail with reference to FIGS. 1-6.

FIG. 1 is a mobile offer system 100, according to an aspect of the invention. The mobile offer system 100 may be implemented using a computing node such as the computing node of FIG. 4. In an embodiment, the mobile offer system 100 may include a network 110, a business device 120, and a mobile device 130. A mobile offer application may be a program, function, or module of a computer program executable by a processor of the mobile offer system 100. For example, the mobile offer application may be stored in the mobile device 130 (e.g., in the mobile offer database) and executable by a processor of the mobile device 130 (e.g., mobile offer processor 132). In another embodiment, the mobile offer application may be stored in a cloud computing node and executable by a processor of a cloud computing node, such as, for example, the cloud computing node of FIG. 5. In another embodiment, the mobile offer application may be stored in the business device 120 (e.g., in the mobile offer database 124) and executable by a processor of the business device 120 (e.g., mobile offer processor 122). The mobile offer application may include instructions to perform one or more steps, such as, for example, the steps described in FIG. 3.

Business device 120 may be a server, laptop computer, tablet computer, netbook computer, personal computer (PC), desktop computer, smart phone, or any programmable electronic device. Business device 120 may include internal and external hardware components, as depicted and described in further detail with respect to FIG. 4. In an embodiment, the business device 120 may include the mobile offer application in the mobile offer database 120 and execute the mobile offer application by the mobile offer processor 124. The business device 120 may operate according to instructions of the mobile offer application in conjunction with the mobile device 130. The business device 120 may include a communication device 126. The communication device 126 may include any communication device known in the art, such as, for example, a Bluetooth device, WiFi device, near-field communication (NFC) device, radio frequency device, or any combination thereof. The business device 120 may communicate, by the communication device 126, with the network 110. For example, the mobile device 130 may transmit and/or receive data associated with the mobile offer application. Data transmitted and/or received by the communication device 126 may be used to facilitate, for example, negotiation of a price of one or more products.

Mobile device 130 may be a laptop computer, tablet computer, netbook computer, personal computer (PC), desktop computer, smart phone, or any programmable electronic device. Mobile device 130 may include internal and external hardware components, as depicted and described in further detail with respect to FIG. 4. In an embodiment, mobile device 130 may include the mobile offer application in the mobile offer database 134 and execute the mobile offer application by the mobile offer processor 132 within the mobile device 130. In another embodiment, a remote device (e.g., a cloud computing node or the business device 120) may include the mobile offer application and execute the mobile offer application. For example, output from the mobile offer application executed by a processor of a remote device may be transmitted to the mobile device 130. The mobile device 130 may include the communication device 136. The communication device 136 may include any communication device known in the art, such as, for example, a Bluetooth device, WiFi device, near-field communication (NFC) device, radio frequency device, or any combination thereof. The mobile device 130 may communicate, by the communication device 136, with the network 110. For example, the mobile device 130 may transmit and/or receive data associated with the mobile offer application. In an example, an offer record may be received by the communication device 136 of the mobile device 130 via the network 110. The offer record may be electronic data associated with an item and a price for the item. The offer record may be stored on the mobile offer database 134 and utilized by the mobile offer program to execute one or more functions, as described, for example, in FIGS. 3A-3B. Data transmitted and/or received by the communication device 136 may be used to facilitate, for example, negotiation of a price of one or more products. The mobile offer database 134 may include a secure mobile commerce container which is completely separated from a user's personal and/or business application data. The secure mobile commerce container may provide an additional level of security for sensitive information, such as, for example, financial information, profile information, etc. By including a secure mobile commerce container, information transmitted or received (e.g., an offer record) may be isolated from sensitive information of a user.

Network 110 may be any combination of connections and protocols that will support communications between mobile device 130 and the business device 120. In an embodiment, network 110 may be the Internet, representing a worldwide collection of networks and gateways to support communications between devices connected to the Internet. In other embodiments, network 110 may be implemented as an intranet, a local area network (LAN), a wide area network (WAN), or a combination thereof. Network 110 may include wired connections, wireless connections, fiber optic connections, or a combination thereof.

In an embodiment, the mobile offer system 100 may facilitate real-time mobile offer records personalized for a user associated with the mobile device 130. The mobile device 130 may securely broadcast information associated with at least one item to a traditional business (e.g., grocery store) if the mobile device 130 is within a proximity of the traditional business. In an embodiment, the proximity may range from approximately 0 feet (e.g., within the traditional business) to approximately 10 miles, and ranges therebetween. In a preferred embodiment, the proximity may range from approximately 0 feet to less than 1 mile from the traditional business. In an embodiment, the mobile offer system 100 may be activated if the mobile device 130 crosses a boundary into a traditional business (e.g., if the mobile device 130 enters the store) or as the proximity decreases (e.g., as the mobile device 130 becomes closer to the traditional business). For example, geo-fencing and location awareness technology may be used to identify a precise location of the mobile device. In an example, one or more sensors located throughout a store may determine, for example, a location, speed, and direction of travel for the mobile device. In another example, an imbedded 3-axis accelerometer may be used to measure and track a location and motion patterns of the mobile device (e.g., traveling down isle #3), which may trigger an electronic device to transmit one or more offer records associated with the location and/or motion patterns of the mobile device. The mobile device 130 may transmit data associated with a user, such as, for example, the user's identity, historical buying patterns, potential items of interest, price constraints, function constraints, etc. For example, a specific grocery shopping list could be keyed into the mobile device 130, as described in FIG. 2A, and viewed and analyzed by a business as the mobile device 130 is within a proximity of a business, approaches the business, or travels through the business. In an embodiment, if a mobile device leaves the store, an offer may be revoked (e.g., the mobile device may receive an indication that the offer is no longer valid).

In an embodiment, another device (e.g., the business device 120) may securely receive and process data from the mobile device 130. The business device 120 may transmit data associated with prices, time sensitive offer records, discounts, or coupons to the mobile device 130 if, for example, the mobile device 130 approaches the business, enters the business, or is within a particular location in the store (e.g., the checkout line). For example, the business device 120 may determine that there is a high probability that a user associated with the mobile device 130 may purchase a pack of gum in the checkout line if the user is offered a 25% discount of gum while the user is in the checkout line. The business device 120 may transmit an offer record for 25% off gum to the mobile device 130 while the mobile device is in the checkout line.

In an embodiment, the mobile offer system 100 may enable real-time negotiation on price(s), term(s), and quantity between the mobile device 130 and the business device 120. In an embodiment, the mobile offer system 100 may enable mobile payment, as described in FIG. 2E. In an embodiment, delivery may occur by traditional means (e.g., by taking an item home from the store). In another embodiment, delivery may occur via shipping which may be initiated and/or automated with the mobile offer application.

FIGS. 2A-2E illustrate a user interface 200, in accordance with an embodiment of the present invention. Embodiments of the present invention may include generating and managing an application on the mobile device 130 that perform one or more functions, such as, for example, broadcasting data associated with a user profile, receiving offer records associated with one or more elements of the user profile, communicating with a business server to negotiate terms (e.g., price, quantity, etc.), or any combination thereof. The user interface 200 may include one or more modules displayed on a touchscreen device. The user interface 200 may request information from a user and/or provide information.

Various elements included in each module may be included in another module or not included at all. For example, an element (e.g., "Selected Item(s)") depicted in FIG. 2B as being in a discount search module may be included in another module or not included at all. Embodiments of the various modules of the user interface 200 are discussed in detail below.

Figure 2A:
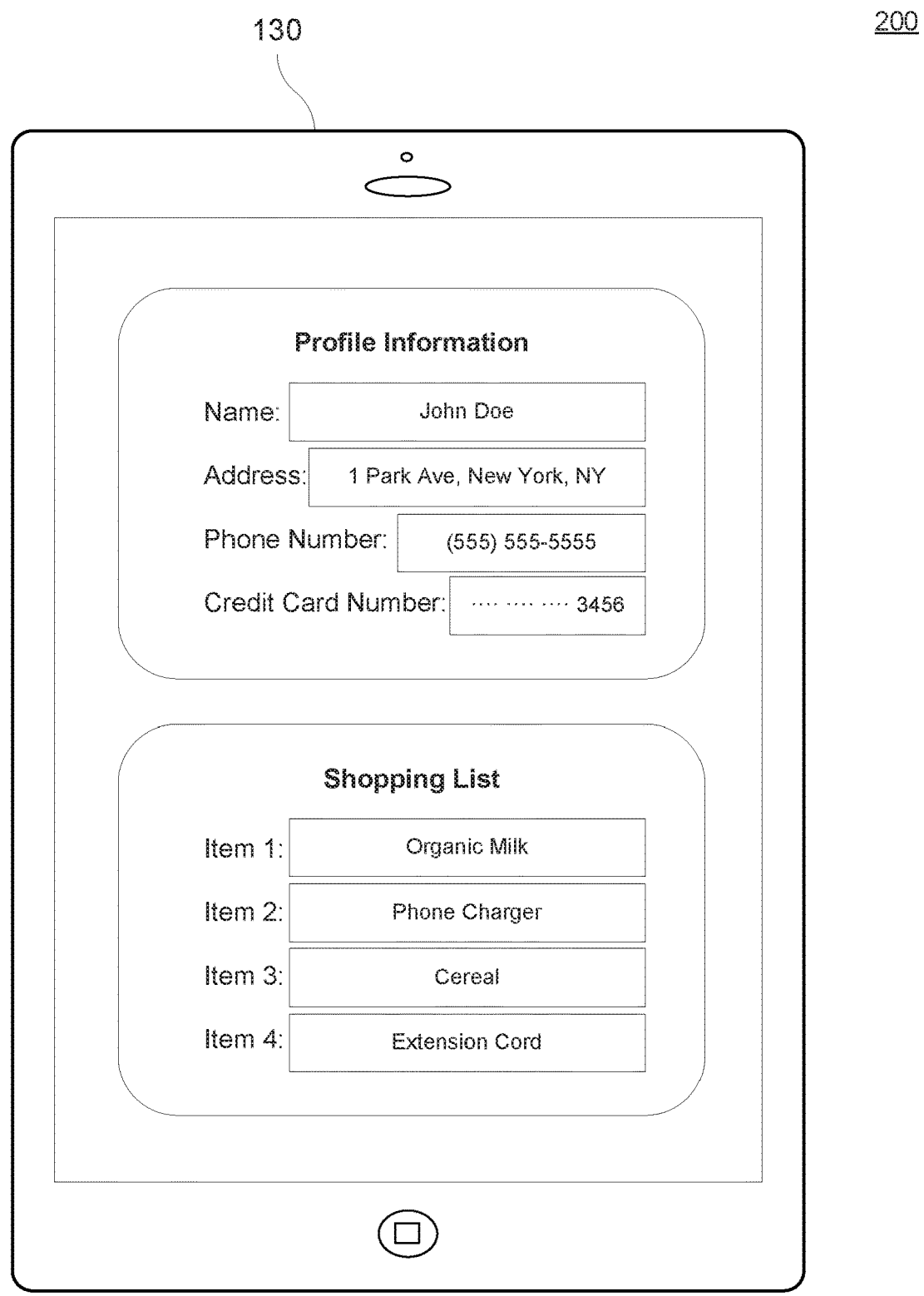
FIGS. 2A-2E illustrate a user interface, in accordance with an embodiment of the present invention.

FIG. 2A illustrates the mobile device 130 displaying a "Profile Information" module and a "Shopping List" module, according to an embodiment of the present invention. The "Profile Information" module and the "Shopping List" module may be generated by a processor (e.g., a graphics processing unit) based on data stored in a database (e.g., the mobile offer database 134). In an embodiment, the profile information module and/or the shopping list module may be used to receive information from a user (e.g., by a text entry box). The profile information module and the shopping list module should not be construed as the only approach for receiving information from a user. Various other methods for receiving information from a user are contemplated, such as, for example, by receiving information from another profile associated with the user (e.g., a social profile or merchant account).

The "Profile Information" module may request information from a user to establish a profile with basic information about the user. For example, the "Profile Information" module may request information regarding the user's name, address, phone number, age, gender, credit card number, or any combination thereof. Information received from a user may be used to generate a user profile. Information in the user profile may be used to perform one or more functions, such as, for example, negotiate discounts near a user's address, share user profile information if permitted in security settings, or any combination thereof. Profile information may be stored in, for example, the mobile offer database 134.

The "Shopping List" module may request information from a user to establish a list of item(s) for which to negotiate a price. One or more shopping lists may be generated and stored in a database (i.e. saved). A shopping list may be stored in, for example, the mobile offer database 134. Saved shopping lists may be used to search for item(s) upon the occurrence of an event, such as, for example, the mobile device 130 receives an input selecting the saved list for a search, a sale indication is received from the business device 120, or a combination thereof. For example, a user may save a shopping list and select the shopping list for a discount search periodically (e.g., for weekly grocery shopping). In another example, a user may save a shopping list and select an option to share the shopping list with one or more businesses devices. A discount notification for one or more items in the shopping list may be received, and an alert may be provided to a user.

Figure 2B:
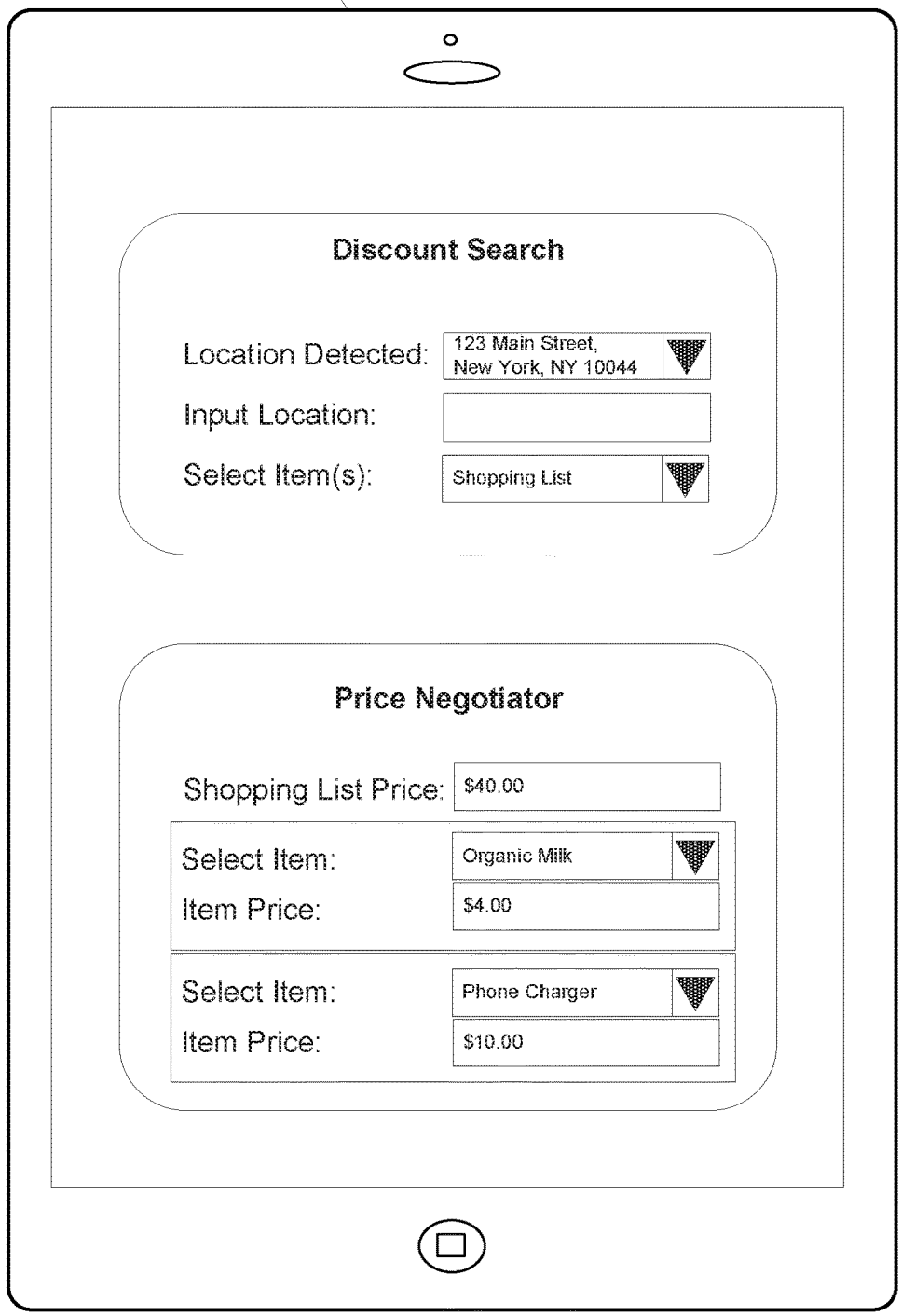

FIG. 2B illustrates a "Discount Search" module and a "Price Negotiator" module displayed on the mobile device 130, according to an embodiment of the present invention. The discount search module and the price negotiator module may be generated by a processor (e.g., a graphics processing unit) based on data stored in a database (e.g., the mobile offer database 134). The discount search module and the price negotiator module may be used to identify one or more items and one or more prices associated with the one or more items. For example, a user may indicate an item for purchase and a maximum price the user is willing to spend on the item. The discount search module and the price negotiator module should not be construed as the only method for identifying items and/or prices associated with items. Various other methods for identifying items and/or prices associated with items are contemplated, such as, for example, an integrated discount search/price negotiator module, an automated price negotiator based on prices previously paid by a user for an item, an automated discount search based on a detected location and the shopping list, or any combination thereof.

The discount search module may provide a text entry box associated with a data set. For example, the text entry box adjacent to the "input location" may be associated with a location of the mobile device 130. In another example, the text entry box adjacent to "selected item(s)" may be associated with items that may be included in a search. In an embodiment, the mobile offer program may automatically fill a text entry box based. For example, the mobile offer program may determine that the mobile phone is located at a particular location and automatically fill the text entry box adjacent to "Location Detected". In another example, the mobile offer program may associate information from a prior user input with a data set by, for example, automatically identifying the shopping list (i.e. items previously input by the user) as items that may be included in a discount search. Items included in the text entry box adjacent to "selected item(s)" may be included in a discount search.

The price negotiator module may provide a text entry box associated with a data set. For example, the text entry box adjacent to the "Shopping List Price" may be associated with a maximum total price a user may be willing to pay for the items included in the shopping list. In another example, the text entry box adjacent to "select item" may be associated with a particular item and "item price" may be associated with a maximum price a user may be willing to pay for the particular item entered in the text entry box adjacent to the "selected item".

In an embodiment, the mobile device 130 may perform a discount search for the included item(s) based on the maximum price(s) indicated for a group of items (e.g., the shopping list) and/or individual items. For example, a business may provide offer records providing a discount totaling an amount and then discontinue the discount. In another example, a business may provide an offer record for a particular amount for an item if a transaction reaches a particular amount. In an embodiment, data associated with a group of items (e.g., the shopping list) and/or individual items as well as corresponding dynamic price information may be transmitted to a remote device (e.g., a business device). The remote device may determine which, if any, discounts associated with the items are included in the offer records. Discounts matching the inputs by a user may be provided as discussed in FIG. 2D.

Figure 2C:
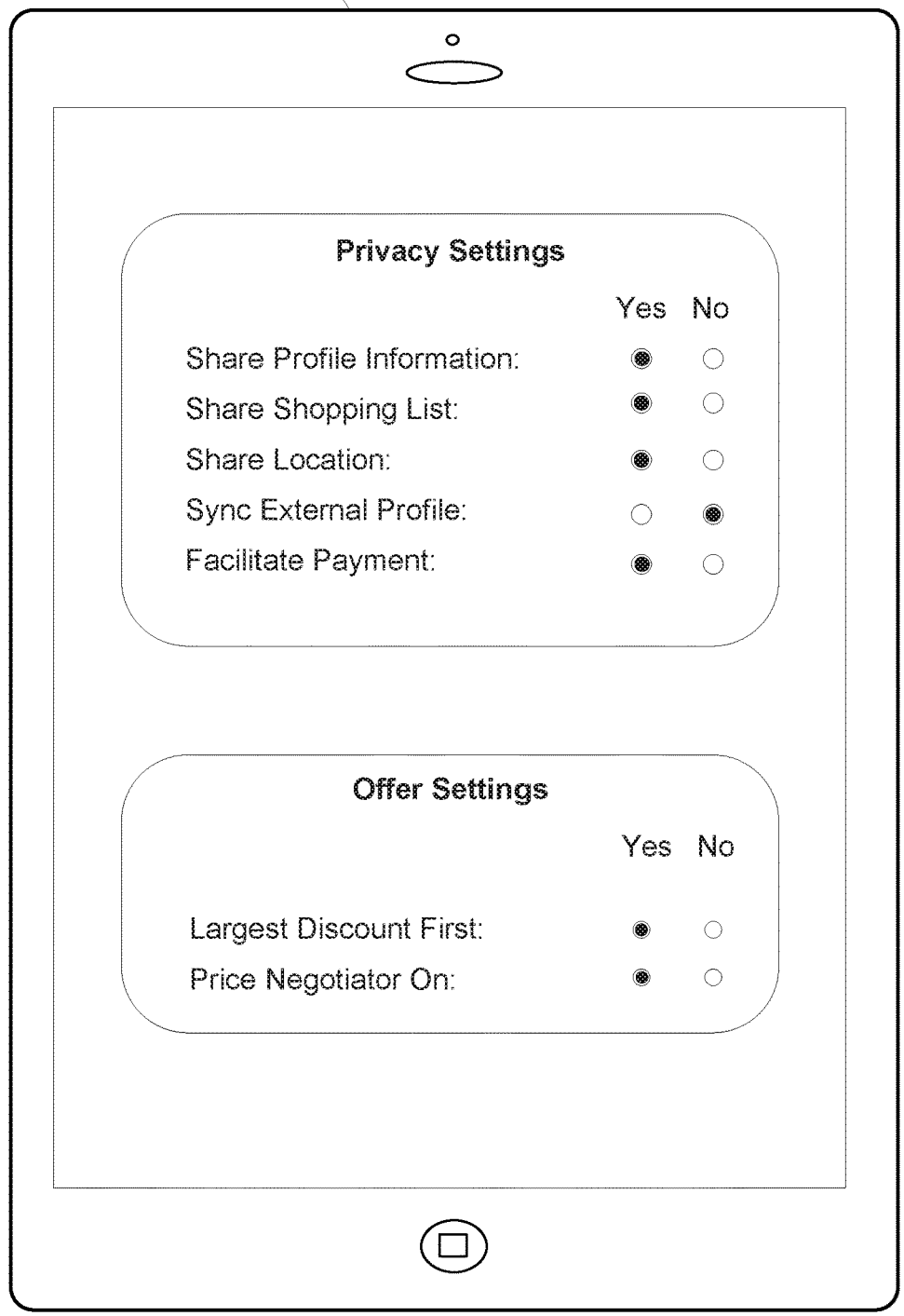

FIG. 2C illustrates a "Privacy Settings" module and an "Offer Settings" module displayed on the mobile device 130, according to an embodiment of the present invention. The "Privacy Settings" module and the "Offer Settings" module may be generated by a processor (e.g., a graphics processing unit) based on data stored in a database (e.g., the mobile offer database 134). The "Privacy Settings" module and the "Offer Settings" module should not be construed as the only method for receiving settings selections from a user. Various other methods for settings selections from a user are contemplated, such as, for example, an integrated privacy settings/offer settings module.

The privacy settings module may receive an input from a user to indicate, for example, whether or not to share particular information about the user. The privacy setting module may include one or more elements, such as, for example, "Share Profile Information", "Share Shopping List", "Share Location", "Sync External Profile", and "Facilitate Payment". In an embodiment, by selecting a button in the "Yes" column, particular information may be shared, and by selecting a button in the "No" column, particular information may not be shared. For example, if the mobile device receives an input for a button in the "Yes" column adjacent to "Share Profile Information", information included in the profile of the user may be shared, for example, with a business device. In an example, if the mobile device receives an input for a button in the "No" column adjacent to the "Sync External Profile", information associated with an external profile may not be retrieved and/or integrated with a local profile. In another example, if the mobile device receives an input for a button in the "Yes" column adjacent to "Facilitate Payment", the mobile offer application may use payment information (e.g., a credit card number) associated with a user to make a payment to a merchant.

In an embodiment, security may be implemented on the mobile device by isolating data. For example, secure mobile commerce containers may be included on the mobile device which are separated from a user's personal and/or business applications and data. Mobile commerce containers may an isolated portion of the mobile offer records database 134 (FIG. 1), part of another database, or an independent database. In an example, credit card information used to facilitate a payment may be isolated in a secure mobile commerce container and extracted only to facilitate a payment. In another example, profile information may be included in a secure mobile commerce container if a button in the "No" column adjacent to "Share Profile Information" is selected.

The offer settings module may receive an input from a user to indicate, for example, whether to negotiate discounts, quantity, quality, delivery time and how to sort received discounts or offer records. In an embodiment, the offer settings module may include one or more elements, such as, for example, "Largest Discount First" and "Price Negotiator On". In an example, if a button in the "Yes" column adjacent to "Largest Discount First" is selected, identified discounts may be sorted accordingly. In another example, if a button in the "Yes" column adjacent to "Price Negotiator On" is selected, a method for negotiating a price associated with an item may be activated.

Figure 2D:
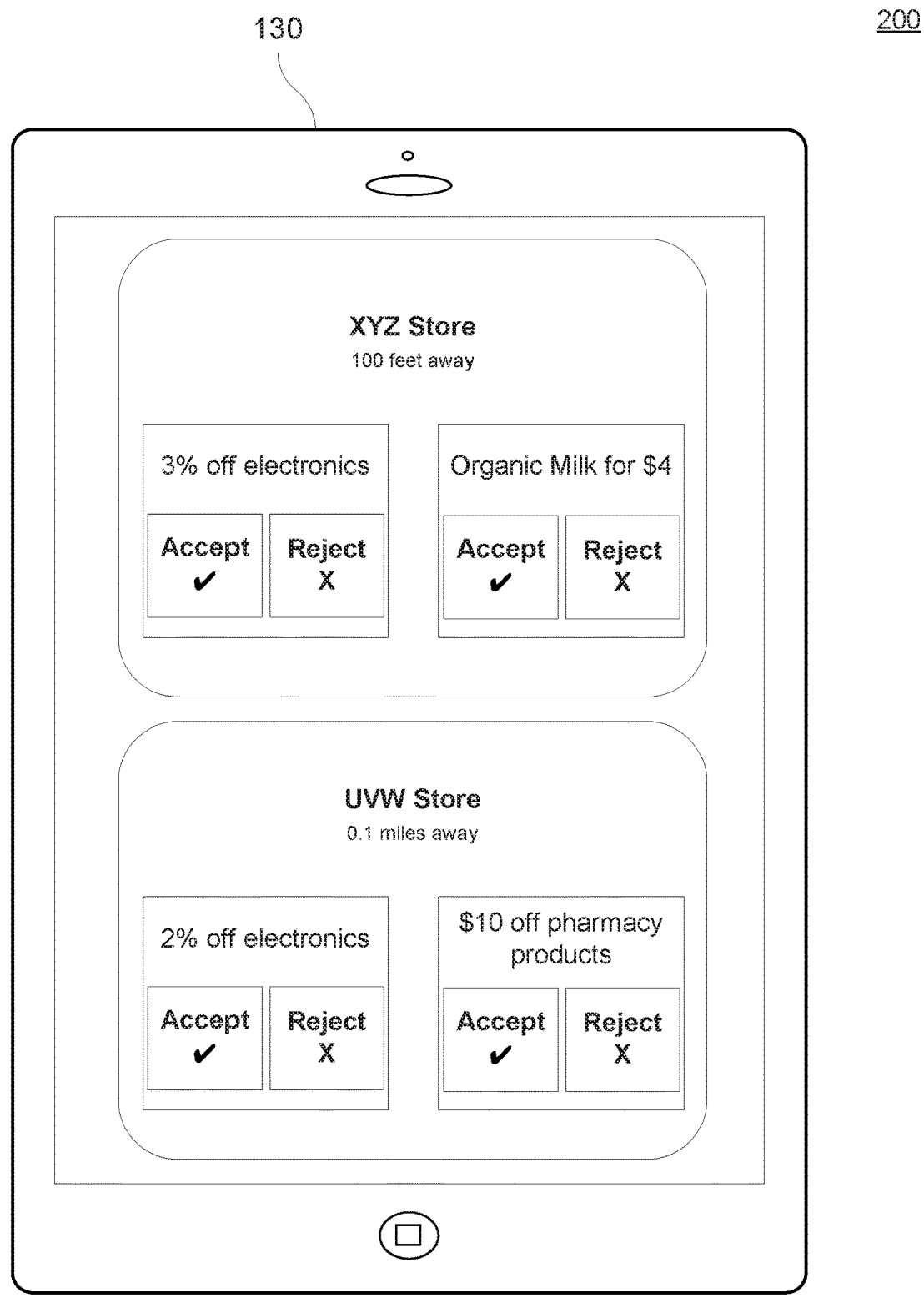

FIG. 2D illustrates a discount module displayed on the mobile device 130, according to an embodiment of the present invention. The discount module may be generated by a processor (e.g., a graphics processing unit) based on data stored in a database (e.g., the mobile offer database 134). The discount module should not be construed as the only method for providing an offer associated with a business to a user. Various other methods for providing an offer associated with a business to a user are contemplated, such as, for example, an audio description of an offer associated with a business.

In an embodiment, the discount module may include an offer associated with a business. In an embodiment, the discount module may include a plurality of offer records associated with a plurality of business. The mobile offer application may determine a ranking of a plurality of offer records and/or a plurality of businesses. The ranking may be based on one or more settings (e.g., settings described in FIG. 2C) and/or one or more offer records provided by a business. The discount module may include the ranking of a plurality of offer records and/or the plurality of businesses. In an example, a user may include electronics in a shopping list (e.g., a phone charger and an extension cord) and one or more offer records may be received from one or more traditional businesses in proximity to the mobile device (e.g., XYZ Store and UVW Store). XYZ Store may be located 100 feet away from the mobile device and UVW Store may be located 0.1 miles away from the mobile device. XYZ Store may offer a 3% discount off the price of electronics and UVW Store may offer a 2% discount off the price of electronics. The mobile offer program may rank the offer from XYZ Store first and the offer from UVW Store second based on one or more considerations, such as, for example, a value of a discount offered, a price of an item after the discount, a total cost of all items in a shopping list after the discount, a distance from the mobile device to the traditional business, or any combination thereof. The discount module may include a button to enable a user may accept or reject a discount offered by a traditional business. In an example, a user may reject the offer from the traditional business and perform a second price negotiation. In another example, a user may accept the offer from the traditional business and proceed with a transaction. Embodiments of transaction methods facilitated by a mobile device are described below with respect to FIG. 2E.

Figure 2E:
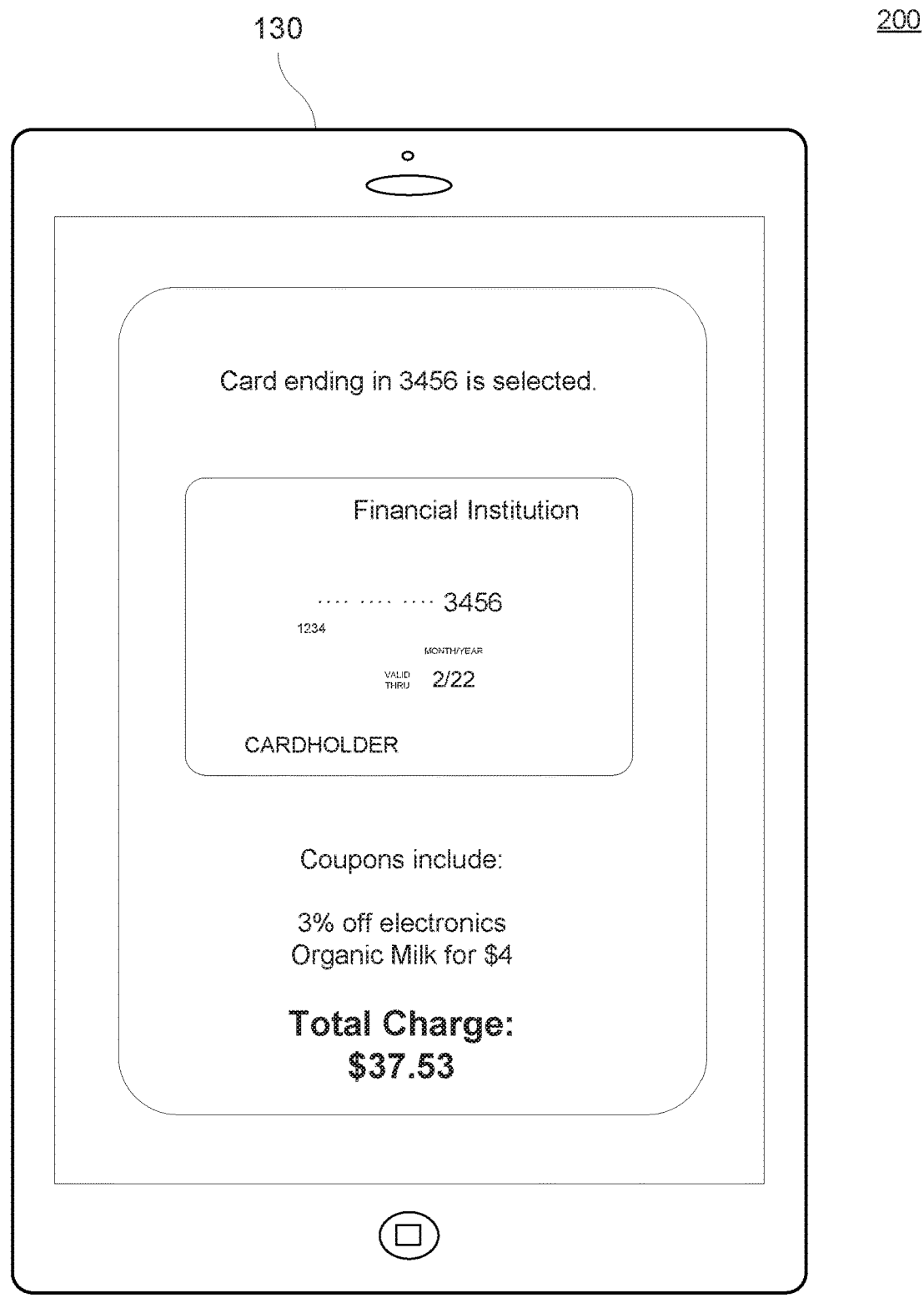

FIG. 2E illustrates facilitating a mobile payment by the mobile offer application on the mobile device 130, according to an embodiment of the present invention. A mobile payment module may be generated by a processor (e.g., a graphics processing unit) based on data stored in a database (e.g., the mobile offer database 134). Although FIG. 2E illustrates a mobile payment on the mobile device 130, various embodiments for completing a transaction with a traditional business are contemplated, such as, for example, using a conventional credit card at a payment terminal.

In an embodiment, a user may accept one or more offer records from a traditional business and proceed with payment on a mobile device. In an embodiment, the one or more items included in a transaction may be identified by a payment terminal (e.g., by scanning the items at a payment terminal). In another embodiment, the one or more items included in a transaction may be identified by a mobile device (e.g., my manual inputting the items or scanning a barcode with a camera). The mobile offer application may transmit data account information (e.g., credit card information) associated with a user to a traditional business to complete a transaction for the one or more items included in the transaction.

Figure 3A:
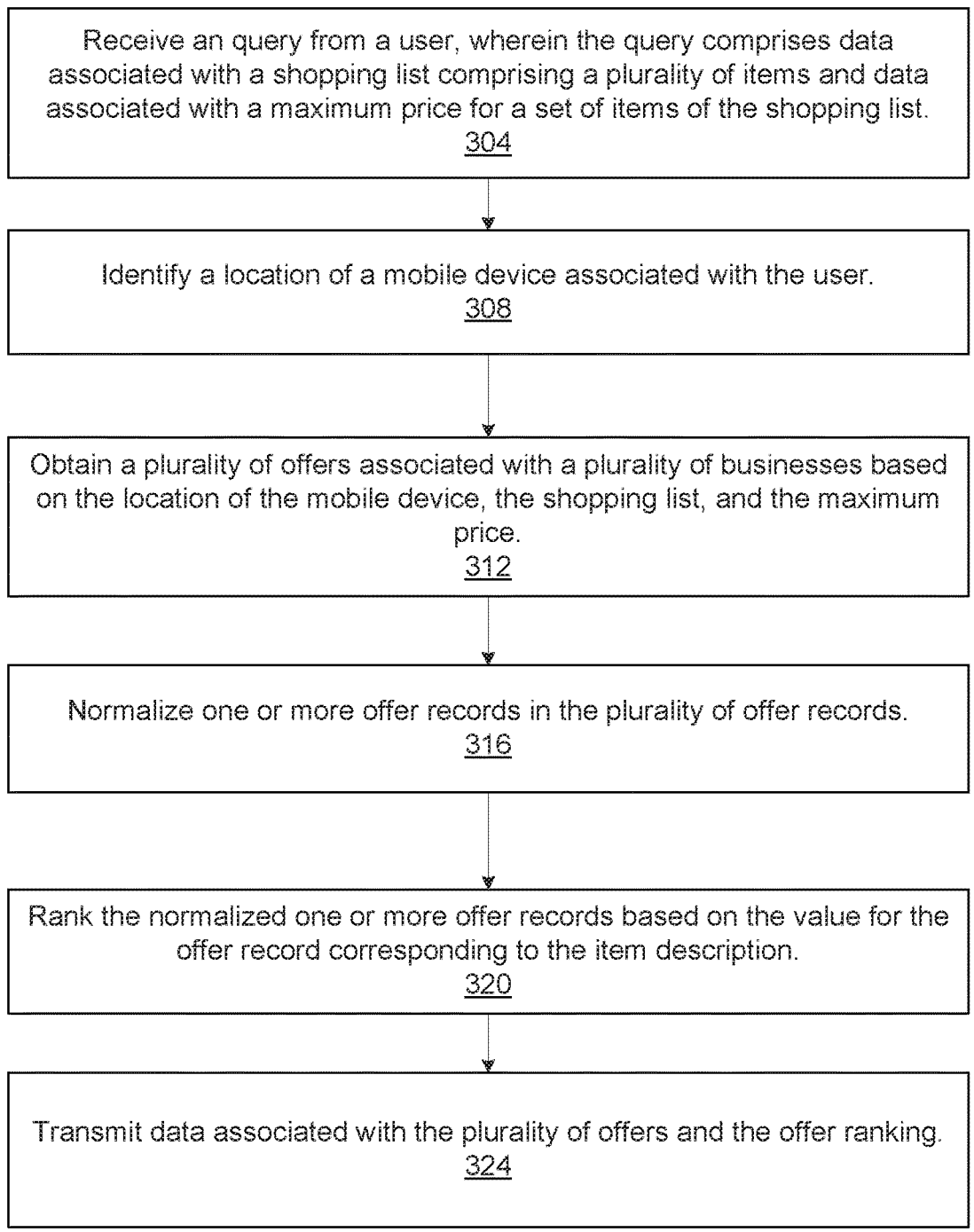

FIGS. 3A-3B are flowcharts of a method 300 and a method 350, respectively, for facilitating real-time mobile offer records, using the mobile offer system 100 of FIG. 1, in accordance with an embodiment of the present invention.

FIG. 3A includes a flowchart of the method 300. Steps of method 300 may be executed using a processor of a computer that encompasses, or is part of the mobile offer system 100, or another system. For example, steps of method 300 may be executed using a cloud computing node. In an embodiment, a method of facilitating real-time mobile offer records may involve receiving an offer query from a user, wherein the offer query comprises data associated with a shopping list comprising a plurality of items and data associated with a maximum price for a set of items of the shopping list (step 304), identifying a location of a mobile device associated with the user (step 308), obtaining a plurality of offer records associated with a plurality of businesses based on the location of the mobile device, the shopping list, and the maximum price (step 312), calculating a value for each offer of the plurality of offer records comprising at least one of a price of an item of the plurality of item description attained from a first set of offer records or a reduction in price for the item of the plurality of item description from a second set of offer records (step 316), determining an offer ranking for the plurality of offer records based on the calculating the value for each offer (step 320), and transmitting data associated with the plurality of offer records and the offer ranking (step 324).

Step 304 may involve receiving an offer query from a user. The offer query may include data associated with a shopping list comprising a plurality of items and data associated with a maximum price for a set of items of the shopping list. In an embodiment, the offer query may be received by a cloud computing node from the mobile device 130 (FIG. 1). For example, a user may enter a items in a shopping list on the mobile device 130 and a maximum price for one or more items and transmit that data to a cloud computing node. In another embodiment, the offer query may be received by a user on the mobile device 130. For example, receiving may involve the mobile device 130 receiving an input from a user regarding one or more items in a shopping list and a maximum price for one or more items. Embodiments may include the maximum price for the set of item descriptions being a maximum price for a single item in the shopping list, a maximum price for a group of items in the shopping list, a maximum price for all the items in the shopping list, or any combination thereof.

Step 308 may involve identifying a location of a mobile device associated with the user. Embodiments may include the location being identified by GPS information, a cell tower detecting the mobile device, one or more sensors in proximity of a store detecting the mobile device, a local area network detecting the mobile device (e.g., a WIFI network), a user input, or any combination thereof. For example, a GPS device within the mobile device may determine a location of the mobile device and transmit the determined location to a cloud computing node and the cloud computing node may identify the received location. In another example, a user may input a location in the mobile device and the mobile device may identify the input location.

Step 312 may involve obtaining a plurality of offer records associated with a plurality of businesses based on the location of the mobile device, the shopping list, and the maximum price. Obtaining the plurality of offer records may involve communicating with another device, such as, for example, one or more business devices, one or more servers, or a combination thereof. For example, a cloud computing node may transmit data associated with an offer query to one or more business devices within a proximity of the location identified in step 308. In another example, the cloud computing node may determine what businesses are located within a proximity of the identified location and transmit an offer query to a server associated with businesses located within a proximity of the identified location. In another example, the mobile device 130 may broadcast the offer query to businesses within a proximity and receive offer records from businesses within a proximity of the broadcast.

Step 316 may involve calculating a value for each offer of the plurality of offer records including at least one of a price of an item of the plurality of item description attained from a first set of offer records or a reduction in price for the item of the plurality of item description from a second set of offer records. In an embodiment, calculating a value for an offer may include calculating a price of an item with the offer. For example, if an offer is for 10% off electronics and a television costs $100, a price for the television with the offer may be $90. In an embodiment, calculating a value for an offer may include calculating a reduction in price for the item from an offer. For example, if an offer is for 10% off electronics and a television costs $100, a reduction in price may be $10. The value of an offer may be based on a price of an item and/or a reduction in price of an item.

Step 320 may involve determining an offer ranking for the plurality of offer records based on the calculating the value for each offer. In an embodiment, the offer ranking may be an ordering of offer records based on a calculated value of the offer records. For example, the offer ranking may begin with an offer that provides an item (or group of items) at a lowest price and end with an offer that provides an item (or group of items) at a highest price. In an example, the offer ranking may begin with an offer that provides a largest reduction in price for an item (or group of items) and end with an offer that provides a smallest reduction in price for an item (or group of items). In an example, the offer ranking may begin with an offer (or group of offer records) that provide a lowest price for the shopping list and end with an offer (or group of offer records) that provide the largest price for the shopping list. In an example, the offer ranking may begin with an offer record (or group of offer records) that provide a largest reduction in price for the shopping list and end with an offer record (or group of offer records) that provide the smallest reduction in price for the shopping list. In an embodiment, a setting for the offer ranking may be selected by a user, for example, on the mobile device 130. For example, a user may select a button associated with "Largest Discount First" for the offer ranking to be based on a reduction in price of an item (or group of items).

Step 324 may involve transmitting data associated with the plurality of offer records and the offer ranking. In an embodiment, a cloud computing node may transmit data associated with the plurality of offer records and the offer ranking to the mobile device 130. In another embodiment, a processor of the mobile device 130 may transmit data associated with the plurality of offer records and the offer ranking to another device (e.g., a display) of the mobile device 130.

FIG. 3B includes a flowchart of the method 350. Steps of method 350 may be executed using a processor of a computer that encompasses, or is part of the mobile offer system 100, or another system. For example, steps of the method 350 may be executed using the mobile device 130 (FIG. 1). In an embodiment, a method of facilitating real-time mobile offer records may involve generating a shopping list module configured for display by the mobile device (step 354), receiving a user input via the shopping list module comprising at least one item, wherein a shopping list is generated comprising the at least one item (step 358), generating a price negotiator module configured for display by the mobile device (step 362), receiving a user input via the price negotiator module indicating a maximum price for a set of items of the shopping list (step 366), obtaining a plurality of offer records associated with a plurality of businesses based on a location of the mobile device, the shopping list, and the maximum price (step 370), calculating a value for each offer record of the plurality of offer records comprising at least one of a price of an item of the plurality of item description attained from a first set of offer records or a reduction in price for the item of the plurality of item description from a second set of offer records (step 374), determining an offer ranking for the plurality of offer records based on the calculating the value for each offer record (step 378), and generating a discount module comprising the offer records the offer ranking, wherein the discount module is configured for display on the mobile device (step 382).

Step 354 may include generating a shopping list module configured for display by the mobile device. In an embodiment, the shopping list module may include elements illustrated and/or described with reference to FIG. 2A. For example, the shopping list module may include graphical elements, such as, for example, a series of text entry boxes adjacent to item numbers. In an example, the shopping list module may include a dropdown menu including a list of items. In an example, the shopping list module may include empty text entry boxes and/or text entry boxes including items that the mobile offer program predicts the user may purchase. The mobile offer program may predict items that the user may purchase based on, for example, a name of the user, a gender of the user, an age of the user, an address associated with the user, a prior item entry in the shopping list, and a purchase history of the user, a location of the mobile device, or any combination thereof.

Step 358 may include receiving a user input via the shopping list module comprising at least one item, wherein a shopping list is generated comprising the at least one item. In an embodiment, a user may enter text associated with one or more items into one or more text entry boxes. In an embodiment, the mobile offer program may identify the text entered into a text box and identify items associated with the text. Identified items associated with text entered into text entry box(es) may be used to generate a shopping list.

Step 362 may include generating a price negotiator module configured for display by the mobile device. In an embodiment, the price negotiator module may include elements illustrated and/or described with reference to FIG. 2B. In an embodiment, the price negotiator module may include a text entry box adjacent to one or more items for identification. For example, a text entry box for a maximum item price associated with the one or more items in an adjacent dropdown menu for one or more items included in a shopping list may be provided. In another example, a text entry box for a maximum shopping list price may be adjacent to text stating "Shopping List Price".

Step 366 may include receiving a user input via the price negotiator module indicating a maximum price for a set of items of the shopping list. In an example, the mobile device 130 may receive an input from a user including an item (or group of items) from a dropdown menu and an associated maximum price for the item (or group of items) in a text entry box adjacent to the dropdown menu. In an example, the mobile device 130 may receive an input from a user for a maximum shopping list price in a text entry box adjacent to text stating "Shopping List Price".

Step 370 may include obtaining a plurality of offer records associated with a plurality of businesses based on a location of the mobile device, the shopping list, and the maximum price. Obtaining the plurality of offer records may involve communicating with another device, such as, for example, one or more business devices, one or more servers, or a combination thereof. For example, a cloud computing node may transmit data associated with an offer query to one or more business devices within a proximity of the location identified in step 308. In another example, the cloud computing node may determine what businesses are located within a proximity of the identified location and transmit an offer query to a server associated with businesses located within a proximity of the identified location. In another example, the mobile device 130 may broadcast the offer query to businesses within a proximity and receive offer records from businesses within a proximity of the broadcast.

Step 374 may involve calculating a value for each offer record of the plurality of offer records comprising at least one of a price of an item of the plurality of item description attained from a first set of offer records or a reduction in price for the item of the plurality of item description from a second set of offer records. In an embodiment, calculating a value for an offer record may include calculating a price of an item with the offer records. For example, if an offer record is for 10% off electronics and a television costs $100, a price for the television with the offer records may be $90. In an embodiment, calculating a value for an offer record may include calculating a reduction in price for the item from an offer record. For example, if an offer record is for 10% off electronics and a television costs $100, a reduction in price may be $10. The value of an offer record may be based on a price of an item and/or a reduction in price of an item.

Step 378 may involve determining an offer ranking for the plurality of offer records based on the calculating the value for each offer record. In an embodiment, the offer ranking may be an ordering of offer records based on a calculated value of the offer records. For example, the offer ranking may begin with an offer record that provides an item (or group of items) at a lowest price and end with an offer record that provides an item (or group of items) at a highest price. In an example, the offer ranking may begin with an offer record that provides a largest reduction in price for an item (or group of items) and end with an offer record that provides a smallest reduction in price for an item (or group of items). In an example, the offer ranking may begin with an offer record (or group of offer records) that provide a lowest price for the shopping list and end with an offer record (or group of offer records) that provide the largest price for the shopping list. In an example, the offer ranking may begin with an offer (or group of offer records) that provide a largest reduction in price for the shopping list and end with an offer record (or group of offer records) that provide the smallest reduction in price for the shopping list. In an embodiment, a setting for the offer ranking may be selected by a user, for example, on the mobile device 130. For example, a user may select a button associated with "Largest Discount First" for the offer ranking to be based on a reduction in price of an item (or group of items).

Step 382 may involve generating a discount module including the offer the offer ranking, wherein the discount module is configured for display on the mobile device. In an embodiment, generating a discount module may include producing data associated with visual elements and organized in a manner capable of providing a user with information regarding the offer record(s) and the offer ranking. In an embodiment, the discount module may include elements illustrated and/or discussed with reference to FIG. 2D. In an embodiment, a processor of the mobile device 130 may transmit data associated with the discount module to a display of the mobile device 130. A user of the mobile device 130 may interact with the displayed discount module to, for example, accept and/or reject offer records(s).

Figure 4:
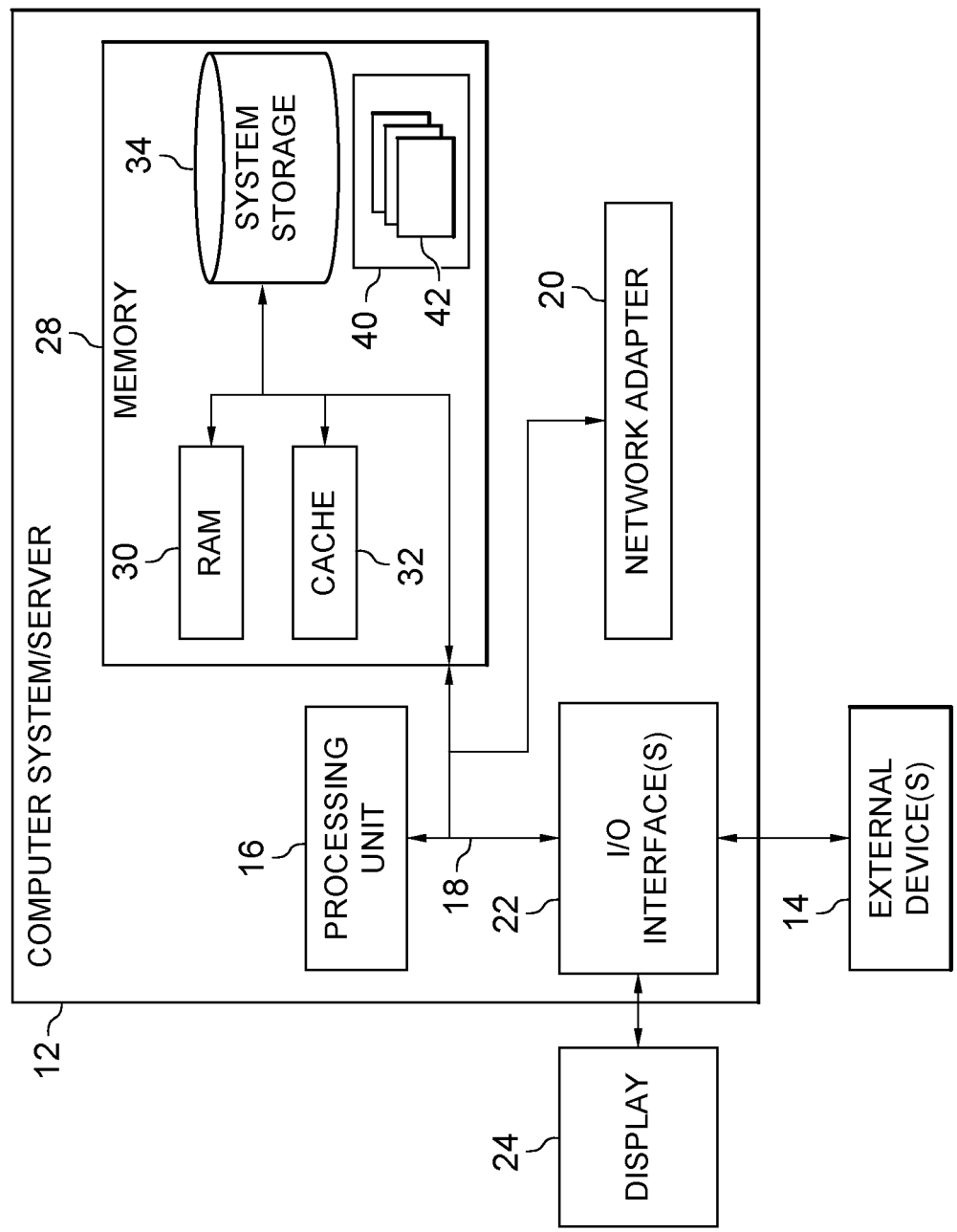
FIG. 4 depicts a block diagram of components of a proxy server computer executing the mobile offer application, in accordance with an embodiment of the present invention.

Referring now to FIG. 4, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
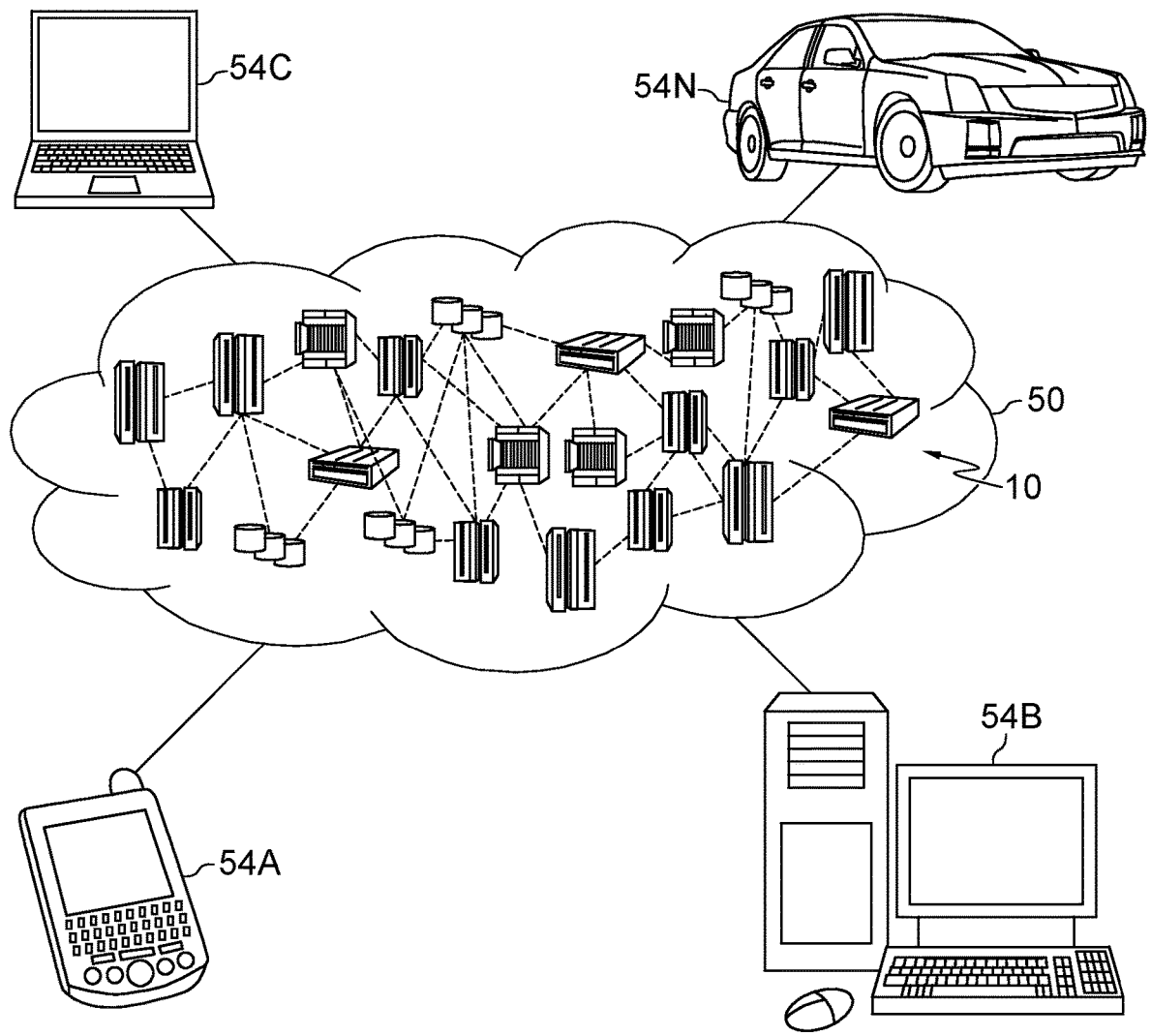
FIG. 5 is a schematic of a cloud computing environment, in accordance with an embodiment of the present invention.

Referring now to FIG. 5, illustrative cloud computing environment 50 is depicted. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
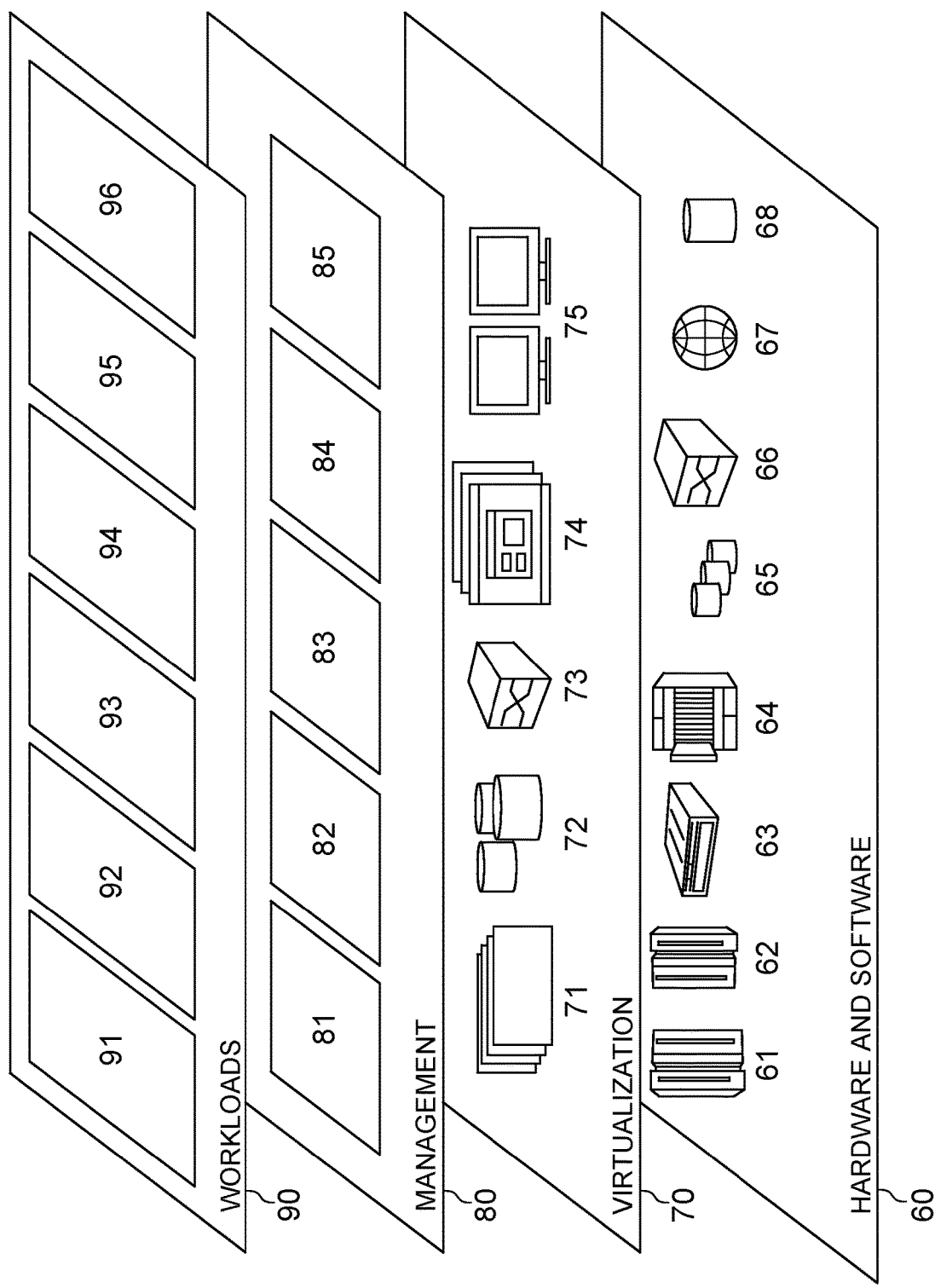
FIG. 6 is a set of abstraction layers provided by the cloud computing environment, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and facilitating real-time mobile offer records 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer program product for data management between a mobile device and another device, the computer program product comprising a computer readable storage medium having program instructions embodied therewith, wherein the computer readable storage medium is not a transitory signal per se, the program instructions executable by a computer to cause the computer to perform a method comprising:

the mobile device dynamically and substantially concurrently negotiating in real-time with two or more business devices, associated with two or more business store locations, to receive offers conforming to terms for a plurality of items, the terms including price, quantity, quality, amount of discount, and delivery time, wherein the two or more business store locations are located in proximity to the mobile device, and the mobile device having preferences for one or more business store locations in the proximity;

identifying that a location of the mobile device is within a proximity of the plurality of business devices;

in response to the identifying, broadcasting, by the mobile device associated with the user, the identified location of the mobile device, a shopping list including a set of items, and a maximum price corresponding to a price constraint associated with each item of the set of items in the shopping list to the two or more business devices wherein the shopping list is received to the mobile device in response to the user interacting with a user interface of the mobile device, and wherein the maximum price is received to the mobile device in response to the user interacting with a user interface of the mobile device;

obtaining, from at least two business servers of the plurality of business servers within the proximity of the identified location of the mobile device, a plurality of offer records based on the identified location of the mobile device, the shopping list including the set of items, and the maximum price corresponding with each item of the set of items in the shopping list, wherein the plurality of offer records include data defining at least one of a price for the set of items in the shopping list or a reduction in the price for the set of items in the shopping list, and wherein the plurality of offer records are obtained before the mobile device is located in the respective business store location;

in response to receiving, by the user interacting with the user interface of the mobile device, a ranking input to the mobile device, wherein the received ranking input is associated with a largest discount first, ranking, by the mobile device, the obtained plurality of offer records, from a largest reduction in the price for the set of items to a smallest reduction in the price for the set of items;

populating each of two or more visual windows with information associated with one or more offer records received from separate business servers, wherein each of the at least two populated visual windows corresponds with a different business server, and wherein each of the at least two populated visual windows includes at least one sub-window numerically indicating a value of a discount associated with the at least one offer record;

simultaneously displaying, on the user interface of the mobile device, a mobile offer ranking comprising the two or more populated visual windows organized to graphically indicate the ranked plurality of offer records from the at least two business servers, and wherein each populated visual window includes the ranked plurality of offer records from a respective business server and numerically indicates a respective distance between the identified location of the mobile device and the respective business store location, and wherein each of the at least one sub-window includes a first visual element configured to enable the user to accept the offer record and a second visual element configured to enable the user to reject the offer record;

generating, by the mobile device, a discount module comprising the plurality of offer records and the ranking, wherein the discount module is configured for display on the mobile device; and in response to detecting, at the simultaneously displayed plurality of offer records in the user interface of the mobile device, the user selecting the second visual element associated with a rejection of a first offer record from a first business server, transmitting, to the first business server, the rejection of the first offer record by the user, wherein the transmitted rejection of the first offer record is configured to enable a real-time negotiation of the first offer record between the mobile device and the first business server.

2. The computer program product of claim 1, further comprising:

the mobile device rejecting one or more negotiated offers, and initiating another price negotiation.

3. The computer program product of claim 1, wherein a value for the negotiated offer comprises at least one of:

the price of an item of the plurality of items; or
a reduction in price for the item of the plurality of items.

4. The computer program product of claim 1, further comprising:

receiving, by the mobile device, user profile data, wherein the user profile data comprises data associated with at least one of:

a name of a user;
a gender of the user;
an age of the user;
an address associated with the user;
a item entry in a prior offer negotiation; and
a purchase history of the user.

5. The computer program product of claim 1, further comprising:

predicting, by the mobile device, at least one item to negotiate based on user profile data.

6. A system for data management between a mobile device and another device, the computer system comprising:

a mobile device comprising one or more computer processors and one or more computer-readable storage media;

program instructions stored on the computer-readable storage media for execution by at least one of the one or more processors, to perform the method comprising:

the mobile device dynamically and substantially concurrently negotiating in real-time with two or more business devices, associated with two or more business store locations, to receive offers conforming to terms for a plurality of items, the terms including price, quantity, quality, amount of discount, and delivery time, wherein the two or more business store locations are located in proximity to the mobile device, and the mobile device having preferences for one or more business store locations in the proximity;

identifying that a location of the mobile device is within a proximity of the plurality of business devices;

in response to the identifying, broadcasting, by the mobile device associated with the user, the identified location of the mobile device, a shopping list including a set of items, and a maximum price corresponding to a price constraint associated with each item of the set of items in the shopping list to the two or more business devices wherein the shopping list is received to the mobile device in response to the user interacting with a user interface of the mobile device, and wherein the maximum price is received to the mobile device in response to the user interacting with a user interface of the mobile device;

obtaining, from at least two business servers of the plurality of business servers within the proximity of the identified location of the mobile device, a plurality of offer records based on the identified location of the mobile device, the shopping list including the set of items, and the maximum price corresponding with each item of the set of items in the shopping list, wherein the plurality of offer records include data defining at least one of a price for the set of items in the shopping list or a reduction in the price for the set of items in the shopping list, and wherein the plurality of offer records are obtained before the mobile device is located in the respective business store location;

in response to receiving, by the user interacting with the user interface of the mobile device, a ranking input to the mobile device, wherein the received ranking input is associated with a largest discount first, ranking, by the mobile device, the obtained plurality of offer records, from a largest reduction in the price for the set of items to a smallest reduction in the price for the set of items;

populating each of two or more visual windows with information associated with one or more offer records received from separate business servers, wherein each of the at least two populated visual windows corresponds with a different business server, and wherein each of the at least two populated visual windows includes at least one sub-window numerically indicating a value of a discount associated with the at least one offer record;

simultaneously displaying, on the user interface of the mobile device, a mobile offer ranking comprising the two or more populated visual windows organized to graphically indicate the ranked plurality of offer records from the at least two business servers, and wherein each populated visual window includes the ranked plurality of offer records from a respective business server and numerically indicates a respective distance between the identified location of the mobile device and the respective business store location, and wherein each of the at least one sub-window includes a first visual element configured to enable the user to accept the offer record and a second visual element configured to enable the user to reject the offer record;

generating, by the mobile device, a discount module comprising the plurality of offer records and the ranking, wherein the discount module is configured for display on the mobile device; and in response to detecting, at the simultaneously displayed plurality of offer records in the user interface of the mobile device, the user selecting the second visual element associated with a rejection of a first offer record from a first business server, transmitting, to the first business server, the rejection of the first offer record by the user, wherein the transmitted rejection of the first offer record is configured to enable a real-time negotiation of the first offer record between the mobile device and the first business server.

7. The system of claim 6, further comprises:
the mobile device rejecting one or more negotiated offers, and initiating another price negotiation.

8. The system of claim 6, wherein a value for the negotiated offer comprises at least one of:
the price of an item of the plurality of items; or
a reduction in price for the item of the plurality of items.

9. The system of claim 6, further comprising:
receiving, by the mobile device, user profile data, wherein the user profile data comprises data associated with at least one of:
a name of a user;
a gender of the user;
an age of the user;
an address associated with the user;
a item entry in a prior offer negotiation; and
a purchase history of the user.

10. The system of claim 6, further comprising:
predicting, by the mobile device, at least one item based on user profile data.

* * * * *